United States Patent
Lee et al.

(10) Patent No.: US 8,885,065 B2
(45) Date of Patent: Nov. 11, 2014

(54) LIGHT LEAKAGE COMPENSATING UNIT IMAGE SENSORS, IMAGE SENSOR ARRAYS INCLUDING THE UNIT IMAGE SENSORS, AND METHODS FOR COMPENSATING FOR LIGHT LEAKAGE OF THE IMAGE SENSOR ARRAYS

(75) Inventors: Kyung-ho Lee, Bucheon-si (KR); Jung-chak Ahn, Yongin-si (KR); Sang-joo Lee, Seoul (KR); Young-hwan Park, Namyangju-si (KR); Dong-yoon Jang, Hwaseong-si (KR); Young-heub Jang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 582 days.

(21) Appl. No.: 13/151,794

(22) Filed: Jun. 2, 2011

(65) Prior Publication Data

US 2011/0298949 A1    Dec. 8, 2011

(30) Foreign Application Priority Data

Jun. 4, 2010    (KR) .................... 10-2010-0053033

(51) Int. Cl.
*H04N 5/76*    (2006.01)
*H04N 5/361*    (2011.01)
*H04N 5/359*    (2011.01)

(52) U.S. Cl.
CPC ............... *H04N 5/361* (2013.01); *H04N 5/359* (2013.01); *H04N 5/3594* (2013.01)
USPC ..................................................... 348/231.99

(58) Field of Classification Search
CPC ...... H04N 5/359; H04N 5/3594; H04N 5/361
USPC ..................................................... 348/231.99
See application file for complete search history.

(56) References Cited

U.S. PATENT DOCUMENTS

2007/0206238 A1* 9/2007 Kawai ........................... 358/482
2011/0108938 A1* 5/2011 Nozaki et al. .................. 257/432

FOREIGN PATENT DOCUMENTS

| JP | 2007-088309 A | 4/2007 |
| JP | 2008-028516 A | 2/2008 |
| KR | 100660866 B1 | 12/2006 |

* cited by examiner

*Primary Examiner* — Usman Khan
(74) *Attorney, Agent, or Firm* — Harness, Dickey & Pierce, P.L.C.

(57) ABSTRACT

A light leakage compensating unit image sensor in a back side illumination method includes a photodiode and a storage diode, in which light input to a back side of the unit image sensor is received only by an area forming an electrode of the photodiode, and an area for forming another electrode of the photodiode and an area for forming two electrodes of the storage diode are separated from each other by a well, thereby compensating light leakage.

6 Claims, 4 Drawing Sheets

LIGHT LEAKAGE COMPENSATING UNIT IMAGE SENSORS, IMAGE SENSOR ARRAYS INCLUDING THE UNIT IMAGE SENSORS, AND METHODS FOR COMPENSATING FOR LIGHT LEAKAGE OF THE IMAGE SENSOR ARRAYS

CROSS-REFERENCE TO RELATED APPLICATIONS

This application claims priority under 35 U.S.C. §119 to Korean patent application No. 10-2010-0053033, filed on Jun. 4, 2010, in the Korean Intellectual Property Office, the entire contents of which are incorporated herein by reference.

BACKGROUND

Inventive concepts relate to a unit image sensor for compensating for light leakage, and more particularly, to a unit image sensor for reducing the influence of light of a long wavelength incident on a back side of the unit image sensor on a storage diode, and a method of compensating for light leakage in an image sensor array for removing a light leakage component left in the storage diode.

A global shutter image sensor circuit that has been recently introduced further includes a storage diode in addition to a conventional photodiode. According to a global shutter method, signals that are photoelectrically converted by all photodiodes in a single frame are transferred to a floating diffusion area at once and then output in units of lines that are sequentially selected. The single frame forms a single screen. It is assumed that, in a single frame, an image sensor circuit is formed of a plurality of lines that are serially connected.

With an increasing demand for a highly integrated circuit in which the size of an integrated circuit decreases but the number of image sensor circuits integrated in a limited area increases, a back side illumination method has been recently suggested. According to the back side illumination method, a total area forming a single electrode that forms a photodiode receives light that is externally input so that a low light performance is improved.

SUMMARY

Inventive concepts provide a unit image sensor for reducing the influence of light of a long wavelength incident on a back side of the unit image sensor on a storage diode.

Inventive concepts provide an image sensor array using the above unit image sensor in a two dimensional array.

Inventive concepts provide a method of compensating for light leakage of the above image sensor array by compensating for a light leakage current left in the storage diode of the image sensor array.

According to an aspect of inventive concepts, there is provided a light leakage compensating unit image sensor in a back side illumination method, which includes a photodiode and a storage diode, in which light input to a back side of the unit image sensor is received only by an area forming an electrode of the photodiode, and an area for forming another electrode of the photodiode and an area for forming two electrodes of the storage diode are separated from each other by a well, thereby compensating light leakage.

According to another aspect of inventive concepts, there is provided an image sensor array having a plurality of lines, the image sensor array including a first image sensor array having a plurality of image sensor circuits arranged in two dimensions, a frame optical black (FOB) image sensor array including a plurality of FOB image sensor circuits configured to compensate for a dark level of a frame, of the FOB image sensor array is on at least one of an first portion and a second portion of the first image sensor array area, a line optical black (LOB) image sensor array including a plurality of LOB image sensor circuits configured to compensate for a dark level for each line, the LOB image sensor array arranged at on at least one of a first side and a second side of the first image sensor array area, and a light leakage compensating image sensor array including a plurality of light leakage compensating image sensor circuits, the light leakage compensating image sensor array between the first image sensor array area and the LOB image sensor array.

According to another aspect of the inventive concepts, there is provided an image sensor array, the image sensor array including a first image sensor array having a plurality of image sensor circuits arranged in two dimensions, a frame optical black (FOB) image sensor array including a plurality of FOB image sensor circuits configured to compensate for a dark level of a frame, of the FOB image sensor array is on at least one of an first portion and a lower portion of the first image sensor array area, a line optical black (LOB) image sensor array including a plurality of LOB image sensor circuits configured to compensate for a dark level for each line, the LOB image sensor array arranged at on at least one of a first side and a second side of the first image sensor array area, and a light leakage compensating image sensor array including a plurality of light leakage compensating image sensor circuits, the light leakage compensating image sensor array between the first image sensor array and the LOB image sensor array area, wherein, the image sensor array is configured to convert electric charges stored in the storage diode into an electric signal, and prevent electric charges generated in a photodiode from being transferred to the storage diode.

According to another aspect of the inventive concepts, there is provided a method of compensating for light leakage using an image sensor array having a first image sensor array having a plurality of image sensor circuits arranged in two dimensions, a frame optical black (FOB) image sensor array including a plurality of FOB image sensor circuits configured to compensate for a dark level of a frame, the FOB image sensor array is on at least one of an first portion and a second portion of the first image sensor array area, a line optical black (LOB) image sensor array including a plurality of LOB image sensor circuits configured to compensate for a dark level for each line, the LOB image sensor array arranged at on at least one of a first side and a second side of the first image sensor array area, and a light leakage compensating image sensor array including a plurality of light leakage compensating image sensor circuits, the light leakage compensating image sensor array between the first image sensor array area and the LOB image sensor array. The method includes detecting an image signal from the first image sensor array area, converting the image signal into an electric signal, compensating for a dark level of a photodiode of the first image sensor array is by using the LOB image sensor array area and the FOB image sensor array area, and compensating for a light leakage current remaining in a storage diode of the first image sensor array by using the light leakage compensating image sensor array area and the LOB image sensor array area.

Another aspect of inventive concepts provides an image sensor array including a first image sensor array including a plurality of first image sensors, the first image sensors configured to receive light and convert the received light into an electric charge, the first image sensors including, a storage node configured to receive the electric charge, and a well and a barrier configured to block electric charges from being input to the storage node.

BRIEF DESCRIPTION OF THE DRAWINGS

Example embodiments of inventive concepts will be more clearly understood from the following detailed description taken in conjunction with the accompanying drawings in which.

DETAILED DESCRIPTION OF EXAMPLE EMBODIMENTS

Figure 1:
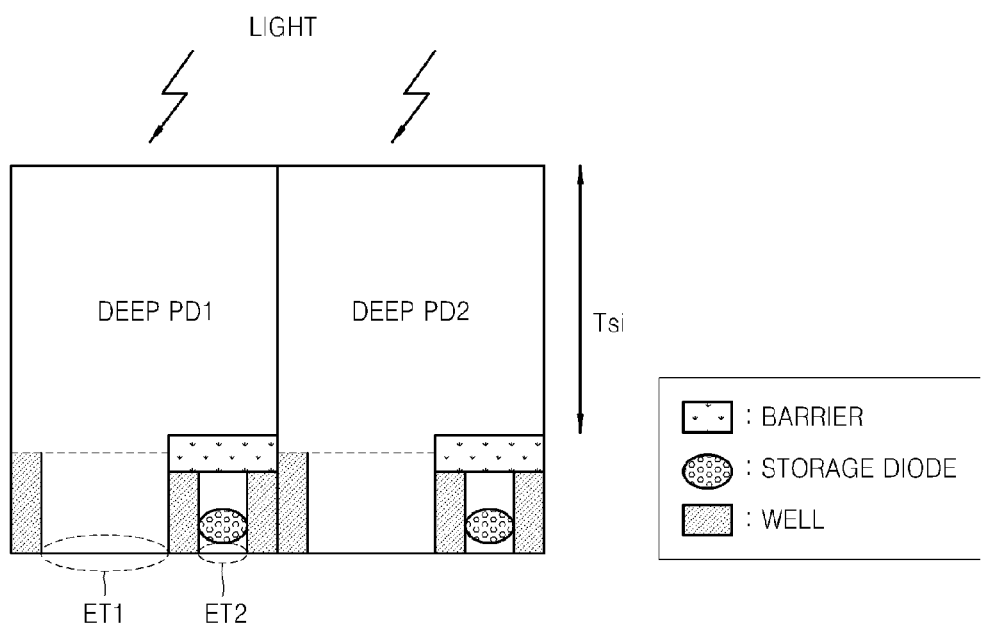
FIG. 1 is a vertical cross sectional view of a unit image sensor according to an example embodiment of inventive concepts.

Various example embodiments will be described more fully hereinafter with reference to the accompanying drawings, in which some example embodiments are shown. Inventive concepts may, however, be embodied in many different forms and should not be construed as limited to the example embodiments set forth herein. Rather, these example embodiments are provided so that this disclosure will be thorough and complete, and will fully convey the scope of the inventive concepts to those skilled in the art. In the drawings, the sizes and relative sizes of elements may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the inventive concepts. As used herein, the singular forms "a," "an" and "the" are intended to include the plural forms as well, unless the context clearly indicates otherwise. It will be further understood that the terms "comprises", "comprising", "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a vertical cross sectional view of a unit image sensor according to an example embodiment of inventive concepts. Referring to FIG. 1, in the unit image sensor, light is received from back sides DEEP PD1 and DEEP PD2 forming an electrode ET1 of a photodiode, and electric charges generated by the back sides DEEP PD1 and DEEP PD2 in response to the incident light undergo a predetermined process and are transferred to a storage diode. An area for forming another electrode ET2 of the photodiode and an area for forming two electrodes of the storage diode are separated from each other by a well.

The global shutter method includes a global shutter operation and a readout operation. In the global shutter operation, signals that are photoelectrically converted by all photodiodes forming a single frame are transferred to a floating diffusion area at once. In the readout operation, electric signals corresponding to the electric charges transferred to the floating diffusion area are output in units of lines.

In FIG. 1, electric charges corresponding to the light input from the back side are generated in one of the back side DEEP PD1 or DEEP PD2 of the photodiode. During the readout operation in which the electric charges generated by each photodiode are transferred to the storage diode and readout, not only no influence on the externally incident light exists in the storage diode, but also electric charges that are redundantly transferred to the photodiode may be prevented.

However, the light incident on an image sensor passes through one of three filters for respectively passing red, green, and blue colors. Since the three colors have different wavelengths, an absorption rate in a semiconductor, in particular, silicon, is different from one another.

Figure 2:
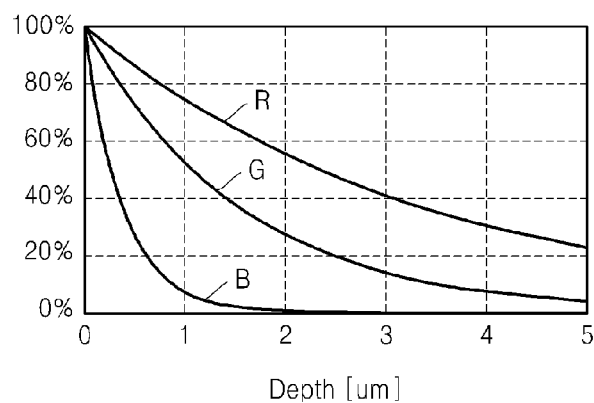
FIG. 2 is a graph illustrating an absorption rate in silicon with respect to light of three colors.

FIG. 2 is a graph illustrating an absorption rate in silicon with respect to light of three colors. Referring to FIG. 2, blue light having a wavelength of 450 nm that is incident on silicon is all absorbed within a wavelength range of about 2 μm, whereas green light having a wavelength of 550 nm that is incident on silicon is all absorbed within a wavelength range between about 5 μm and about 6 μm. In contrast, the absorption rate of red light having a wavelength of 650 nm that is incident on silicon is about 80% within a wavelength range of about 5 μm.

The three colors incident on a silicon area forming an electrode of a photodiode have different absorption rates. Accordingly, the lights of three colors are absorbed only in the back side DEEP PD1 or DEEP PD2. Also, to prevent an influence on the storage diode, a distance Tsi from the back side surface for receiving light to an area where the storage diode is formed is at least 5 μm.

In the readout operation, the electric charge transfer path between the photodiode and the storage diode formed in the global shutter operation is blocked. At this time, the photodiode continuously generates electric charges corresponding to the incident light. The photodiode that has transferred all electric charges to the storage diode in the global shutter operation should not transfer newly generated electric charges during the readout operation to the storage diode. However, the newly generated electric charged by the photo-diode may be transferred to the storage diode due to diffusion or drift, which may distort a signal.

To address the above issue, in inventive concepts, the photodiode and the storage diode forming a single image sensor circuit are separated by using a well and a barrier for blocking direct input of electric charges is installed at the upper portion of the storage diode.

That is, according to inventive concepts, to reduce an influence of light of a long wavelength on a storage diode, the surface of a back side and the storage diode are separated by a predetermined distance, and a photodiode and the storage diode are separated by using a well.

Also, according to inventive concepts, a barrier for directly blocking input electric charges is formed on the upper portion of the storage diode. The barrier may be embodied as a P-type diffusion area.

Even when an image sensor having the vertical structure of FIG. 1 is in use, it is difficult to completely prevent input of a small amount of electric charges into the storage diode in the readout operation. Thus, when an electric signal corresponding to electric charges is transferred to the storage diode, distortion of the electric signal is not generated only by removing a light leakage current input to the storage diode in the readout operation. In inventive concepts, an image sensor array, which may perform auto dark level compensation (ADLC) for compensating for a dark level and auto light leakage compensation (ALLC) for removing a light leakage current input to the storage diode, may be used. In the following description, an image sensor array according to inventive concepts employs a back side illumination method and a global shutter method.

Figure 3:
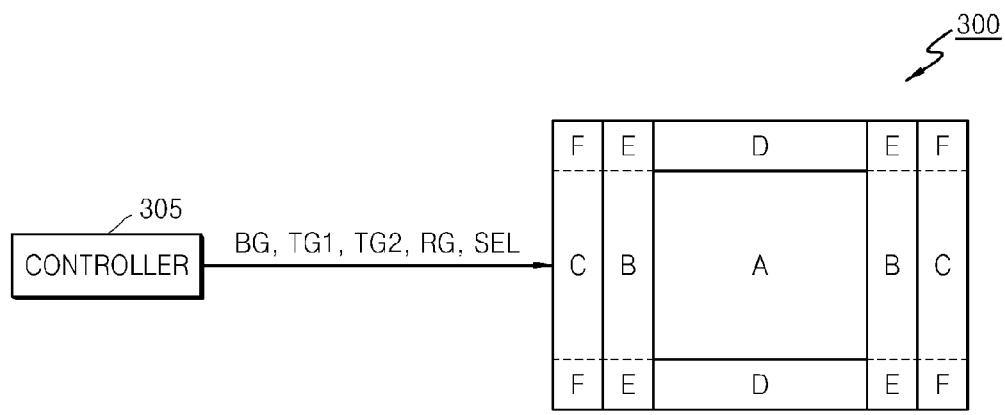
FIG. 3 illustrates an image sensor array according to an example embodiment of inventive concepts.

FIG. 3 illustrates an image sensor array 300 according to an example embodiment of inventive concepts. Referring to FIG. 3, the image sensor array 300 according to the present example embodiment may be divided into a image sensor array area A, a light leakage compensating image sensor array area B, a line optical black (LOB) image sensor array area C, and a frame optical black (FOB) image sensor array area D.

A plurality of first image sensor circuits are arranged in two dimensions in the first image sensor array area A. A plurality of light leakage compensating image sensor circuits are arranged in the light leakage image sensor array area B. A plurality of LOB image sensor circuits used for compensating for a dark level for each line is provided in the LOB image sensor array area C. The LOB image sensor array area C is arranged at the left and right sides of the first image sensor array area A. Although the LOB image sensor array area C is illustrated as being arranged at both sides of the first image sensor array area A in FIG. 3, the LOB image sensor array area C may be arranged at one side of the first image sensor array area A. A plurality of FOB image sensor circuits used for compensating for a dark level for each frame are provided in the FOB image sensor array area D. The FOB image sensor array area D is arranged at least on one of upper and lower parts of the first image sensor array area A.

The FOB image sensor array area D compensates for a dark level for each frame and is illustrated in FIG. 3 to be arranged in the upper and lower parts of the first image sensor array area A. This is from an assumption that a photoelectric signal is output from the upper part of the first image sensor array area A in a downward direction. However, when a photoelectric signal is assumed to be output from one side surface of the first image sensor array area A to and opposite side surface of the one side surface, the FOB image sensor array area D is arranged at the left and right sides of the first image sensor array area A.

The horizontal length of the FOB image sensor array area D is the same as that of the first image sensor array area A. The vertical length of the LOB image sensor array area C is the same as a sum of the vertical length of the FOB image sensor array area D and the vertical length of the first image sensor array area A.

A controller 305 is configured to output a blooming control signal BG a first transfer signal TG1, a second transfer signal TG2, a reset control signal RG, and a selection control signal SEL to the image sensory array 300.

Circuits for forming the four areas A-D included in the image sensor array 300 are described in detail with reference to FIGS. 4-6. The circuits forming the first image sensor array area A and the FOB image sensor array area D are the same. In particular, two areas in FIG. 3, that is, a first area E and a second area F, are portions of the light leakage compensating image sensor array area B and the LOB image sensor array area C, respectively, which correspond to the FOB image sensor array area D. The same circuit as that embodied in the light leakage compensating image sensor array area B is arranged in the first corresponding area E. The same circuit as that embodied in the LOB image sensor array area C is arranged in the second corresponding area F.

Figure 4:
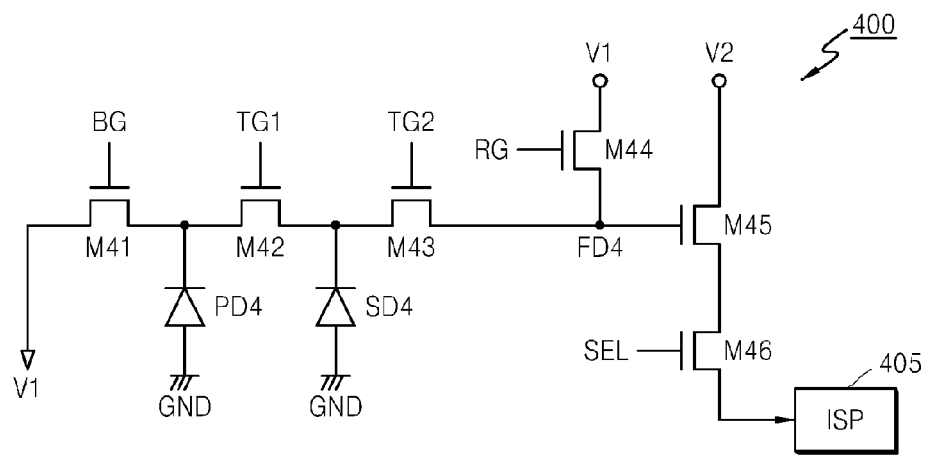
FIG. 4 is a circuit diagram of a first image sensor circuit forming a first image sensor array area A of FIG. 3.

FIG. 4 is a circuit diagram of an example first image sensor circuit 400 of the plurality of first image sensor circuits forming the first image sensor array area A of FIG. 3. Referring to FIG. 4, the first image sensor circuit 400 includes a blooming transistor M41, a first transfer transistor M42, a second transfer transistor M43, a reset transistor M44, a conversion transistor M45, a selection transistor M46, a photodiode PD4, and a storage diode SD4.

The blooming transistor M41 has one terminal that is connected to a first power voltage source V1, and a gate to which a blooming control signal BG is applied. The first transfer transistor M42 has one terminal that is connected to the other terminal of the blooming transistor M41, and a gate to which the first transfer signal TG1 is applied. The second transfer transistor M43 has one terminal that is connected to the other terminal of the first transfer transistor M42 and the other terminal that is connected to a floating diffusion area FD4, and a gate to which the second transfer signal TG2 is applied. The reset transistor M44 has one terminal that is connected to the first power voltage source V1 and the other terminal that is connected to the floating diffusion area FD4, and a gate to which the reset control signal RG is applied. The conversion transistor M45 has one terminal that is connected to a second power voltage source V2, and generates an electric signal corresponding to electric charges stored in the floating diffusion area FD4. The selection transistor M46 passes or blocks an electric signal output from the other terminal of the conversion transistor M45 according to the selection control signal SEL applied to a gate thereof.

The photodiode PD4 has one terminal that is connected to a third power voltage source GND and the other terminal that is connected to a common terminal of the blooming transistor M41 and the first transfer transistor M42. The storage diode SD4 has one terminal that is connected to the third power voltage source GND and the other terminal that is connected to a common terminal of the first transfer transistor M42 and the second transfer transistor M43.

The light input to the back side of the unit image sensor may be received by only one area of the photodiode PD4. The other area of the photodiode PD4 and the entire area of the storage diode SD4 may be separated from each other by a well. The third power voltage source GND may be a ground voltage. The first power voltage source V1 and the second power voltage source V2 may have relatively higher voltage levels than that of the third power voltage source GND. In some cases, the first power voltage source V1 and the second power voltage source V2 may have the same voltage level.

Figure 5:
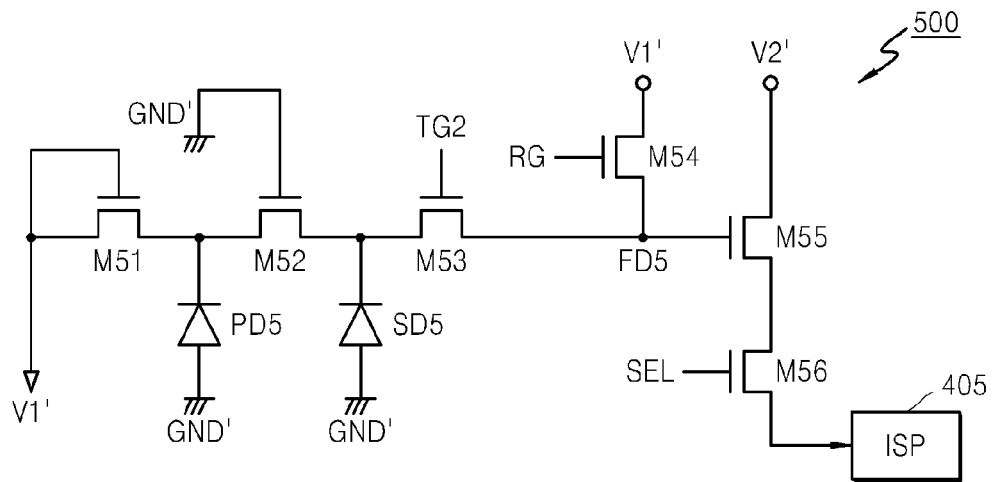
FIG. 5 is a circuit diagram of a light leakage compensating image sensor circuit forming a light leakage compensating image sensor array area B of FIG. 3.
Figure 6:
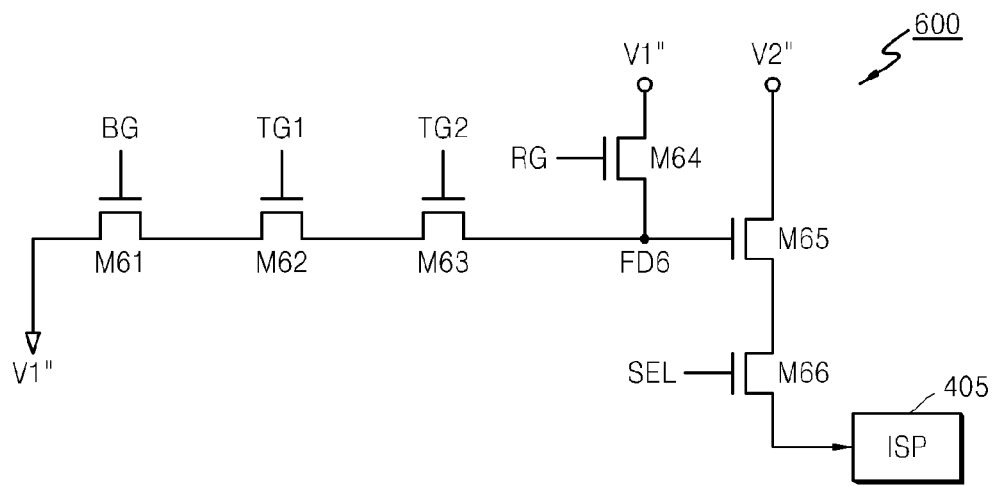
FIG. 6 is a circuit diagram of a line optical black (LOB) image sensor circuit forming a LOB image sensor array area C of FIG. 3.

Although not included in the descriptions on the circuits of FIGS. 5 and 6, the separation of the photodiode and the storage diode by a well and the voltage levels of the power voltages also apply to the circuits of FIGS. 5 and 6.

FIG. 5 is a circuit diagram of an example light leakage compensating image sensor circuit 500 of the plurality of light leakage compensating image sensor circuits forming the light leakage compensating image sensor array area B of FIG. 3. Referring to FIG. 5, the light leakage compensating image sensor circuit 500 includes a blooming transistor M51, a first transfer transistor M52, a second transfer transistor M53, a reset transistor M54, a conversion transistor M55, a selection transistor M56, a photodiode PD5, and a storage diode SD5.

The blooming transistor M51 has one terminal and a gate that are connected to a first power voltage source V1'. The first transfer transistor M52 has one terminal that is connected to the other terminal of the blooming transistor M51, and a gate to which a third power voltage source GND' is applied. The second transfer transistor M53 has one terminal that is connected to the other terminal of the first transfer transistor M52 and the other terminal that is connected to a floating diffusion area FD5, and a gate to which the second transfer signal TG2 is applied. The reset transistor M54 has one terminal that is connected to the first power voltage source V1' and the other terminal that is connected to the floating diffusion area FD5, and a gate to which the reset control signal RG is applied. The conversion transistor M55 has one terminal that is connected to a second power voltage source V2', and generates an electric signal corresponding to electric charges stored in the floating diffusion area FD5 connected to a gate thereof. The selection transistor M56 blocks or passes an electric signal output from the other terminal of the conversion transistor M55 according to the selection control signal SEL applied to a gate thereof.

The photodiode PD5 has one terminal that is connected to the third power voltage source GND' and the other terminal that is connected to a common terminal of the blooming transistor M51 and the first transfer transistor M52. The storage diode SD5 has one terminal that is connected to the third power voltage source GND' and the other terminal that is connected to a common terminal of the first transfer transistor M52 and the second transfer transistor M53.

FIG. 6 is a circuit diagram of an example LOB image sensor circuit 600 of the plurality of LOB image sensor circuits forming the LOB image sensor array area C of FIG. 3. Referring to FIG. 6, the LOB image sensor circuit 600 includes a blooming transistor M61, a first transfer transistor M62, a second transfer transistor M63, a reset transistor M64, a conversion transistor M65, and a selection transistor M66.

The blooming transistor M61 has one terminal that is connected to a first power voltage source V1" and a gate to which the blooming control signal BG is applied. The first transfer transistor M62 has one terminal that is connected to the other terminal of the blooming transistor M61, and a gate to which a first transfer signal TG1 is applied. The second transfer transistor M63 has one terminal that is connected to the other terminal of the first transfer transistor M62, a gate to which the second transfer signal TG2 is applied, and the other terminal that is connected to a floating diffusion area FD6. The reset transistor M64 has one terminal that is connected to the first power voltage source V1", a gate to which the reset control signal RG is applied, and the other terminal that is connected to the floating diffusion area FD6. The conversion transistor M65 has one terminal that is connected to a second power voltage source V2", and generates an electric signal corresponding to electric charges stored in the floating diffusion area FD6 connected to a gate thereof. The selection transistor M66 blocks or passes an electric signal output from the other terminal of the conversion transistor M65 according to the selection control signal SEL applied to a gate thereof.

As shown in FIGS. 4-6, the outputs of the first image sensor circuit 400, the light leakage compensating image sensor circuit 500 and the LOB image sensor circuit 600 are received by an image signal processor (ISP) 405. The ISP 405 is configured to generate a sampling signal SAM.

Before describing the structure of the image sensor array 300 of FIG. 3 is an optimal structure for performing a function of performing the ALLC, in addition to the conventional ADLC, to remove a light leakage current input to the storage diode in the readout operation, the operations of the first image sensor circuit 400, the light leakage compensating image sensor circuit 500, and the LOB image sensor circuit 600 illustrated in FIGS. 4-6 will be described below. First, the operation of the first image sensor circuit 400 of FIG. 4 is described.

Figure 7:
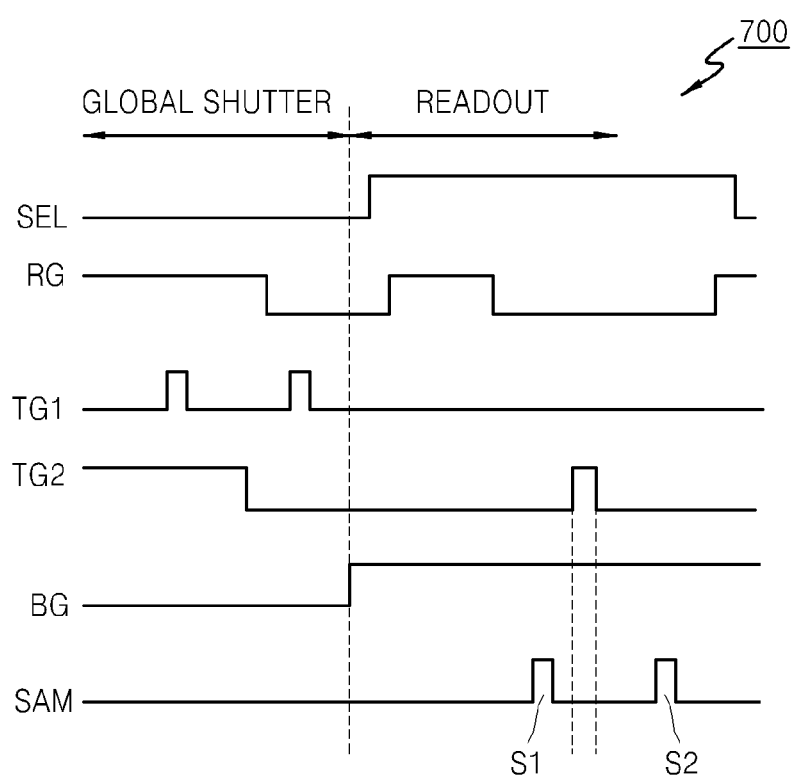
FIG. 7 is a waveform diagram related to the operation of the first image sensor circuit of FIG. 4.

FIG. 7 is a waveform diagram related to the operation of the first image sensor circuit 400 of FIG. 4. Referring to FIG. 7, the method may be divided into a global shutter section and a readout section.

In the global shutter section, that is, when the blooming control signal BG and the reset control signal RG are in a logic low state, the electric charges generated by the photodiode PD4 are transferred to the storage diode SD4 via the first transfer transistor M42 that is turned on by the first transfer signal TG1. At this time, since the blooming control signal BG is in a logic low state, the blooming transistor M41 is turned off so that the electric charges generated by the photodiode PD4 are not moved to the first power voltage V1 via the blooming transistor M41.

The readout section starts after electric charges are stored in the storage diode SD4, in which the blooming control signal BG becomes logic high. Since in the readout section the blooming control signal BG is in a logic high state, the electric charges generated by the photodiode PD4 are moved to the first power voltage source V1 via the blooming transistor M41 that is turned on. The electric charges generated by the photodiode PD4 are transferred to the storage diode SD4 during the global shutter section. In the readout section, the photodiode PD4 continuously generates electric charges corresponding to incident light. However, if the electric charges generated by the photodiode PD4 are transferred to the storage diode SD4 in the readout section, a converted signal may be distorted. Thus, by continuously having the blooming transistor M41 turned on during the readout operation, the transfer of the electric charges generated by the photodiode PD4 to the storage diode SD4 in the readout section may be prevented. Thus, in the readout operation, the electric charges generated by the photodiode PD4 may be moved to the first power voltage source V1 and not to the storage diode SD4.

After the blooming control signal BG becomes logic high, an image sensor circuit selects the selection control signal SEL is selected by activating the selection control signal SEL. Next, the floating diffusion area FD4 is reset by using the reset control signal RG. An image sensor system detects a first conversion voltage S1 corresponding to the floating diffusion area FD4 that is reset according to the sampling signal SAM. The electric charges stored in the storage diode SD4 are transferred to the floating diffusion area FD4 by activating the second transfer control signal TG2. The image sensor system detects a second conversion voltage S2 corresponding to the electric charges transferred to the floating diffusion area FD4 according to the sampling signal SAM. In a correlated double sampling (CDS) method, a signal corresponding to the light incident on the photodiode PD4 may be a voltage difference between the first conversion voltage S1 and the second conversion voltage S2.

The first image sensor circuit 400 of FIG. 4 and the light leakage compensating image sensor circuit 500 of FIG. 5 are the same, except that the voltages applied to the gates of the blooming transistors M41 and M51 and the first transfer transistors M42 and M52 are different from each other. In the light leakage compensating image sensor circuit 500 of FIG. 5, since the blooming transistor M51 is always turned on, the electric charges generated by the photodiode PD5 are moved to the first power voltage source V1'. Also, since the first transfer transistor M52 is always turned off, the electric charges generated by the photodiode PD5 are not transferred to the storage diode SD5. In other words, the light leakage compensating image sensor circuit 500 of FIG. 5 generates a conversion voltage corresponding to the electric charges stored in the storage diode SD5.

In the circuit of FIG. 5, electric charge will not be stored in the storage diode SD5. However, in the structure illustrated in FIGS. 1 and 2, light of a long wavelength may be incident on the storage diode SD5 or the electric charges generated from the photodiode PD5 that receives light may be stored in the storage diode SD5. Inventive concepts are provided to perform compensation in the above cases, i.e., the storage diode SD5 stores electric charges from the photodiode PD5 in the circuit of FIG. 5, for which compensation method will be described later.

The LOB image sensor circuit 600 of FIG. 6 has the same structure as the image sensor circuit 400 of FIG. 4, except that the photodiode PD4 and the storage diode SD4 are omitted. In the LOB image sensor circuit 600, electric charge will not be stored in the floating diffusion area FD6, except for the electric charges corresponding to a reset voltage by the reset transistor M64. The amount of electric charges stored in the floating diffusion area FD6 may be changed by electric charges other than the electric charges corresponding to the reset voltage, due to a dark level such as leakage current.

To prevent generation of distortion of a conversion voltage by a dark level, the ADLC method is applied to the conversion voltage detected in the readout operation. The ADLC method may be expressed as Equation 1.

$$ADLC=(A-C)-(D-F) \quad \text{[Equation 1]}$$

The ADLC method performs compensation line-by-line. Referring to Equation 1, the ADLC method is defined by a difference value between a first differential dark level value (A–C) and a second differential dark level value (D–F). The first differential dark level value (A–C) is a difference value between values detected by an image sensor circuit and a LOB image sensor circuit arranged in a predetermined line. The second differential dark level value (D–F) is a value obtained by subtracting a value F detected by the LOB image sensor circuit arranged in the same line where a FOB image sensor circuit is arranged, from a value D detected by the FOB image sensor circuit. The value detected by the image sensor circuit includes a dark level that is compensated by the ADLC method line-by-line. For convenience of explanation, letters A, C, D and F indicating image sensor areas in FIG. 3 are used to describe the corresponding detected values.

The ALLC method may be expressed as Equation 2.

$$ALLC=(B-C)-(E-F) \quad \text{[Equation 2]}$$

The ALLC method performs compensation line-by-line. Referring to Equation 2, the ALLC method is defined by a difference value between a first differential dark level value (B–C) and a second differential dark level value (E–F). The first differential dark level value (B–C) is a difference value between a value detected by a light leakage compensating image sensor circuit and a value detected by a LOB image sensor circuit C arranged in a predetermined line. The second differential dark level value (E–F) is a value obtained by subtracting a value detected by the LOB image sensor circuit F from a value detected by the light leakage compensating image sensor circuit E arranged in the same line where the FOB image sensor circuit is arranged. The value detected by the first image sensor circuit includes a light leakage current that is compensated by the ALLC method line-by-line.

An electric signal matching the light that is finally input may be generated, by compensating for the difference value between the ADLC method for compensating for a dark level and the ALLC method for compensating for light leakage. Equation 3 is defined by final compensation values (ADLC &ALLC) of the ADLC and ALLC methods.

$$ADLC\ \&\ ALLC=\{(A-C)-(D-F)\}-\{(B-C)-(E-F)\} \quad \text{[Equation 3]}$$

Inventive concepts provide the image sensor array structure of FIG. 3 and the light leakage compensating method as expressed by Equation 3.

While inventive concepts have been particularly shown and described with reference to example embodiments thereof, it will be understood that various changes in form and details may be made therein without departing from the spirit and scope of the following claims.

What is claimed is:

1. An image sensor array having a plurality of lines, the image sensor array comprising:
   a first image sensor array having a plurality of first image sensor circuits arranged in two dimensions;
   a frame optical black (FOB) image sensor array including a plurality of FOB image sensor circuits configured to compensate for a dark level of a frame, the FOB image sensor array on at least one of a first portion and a second portion of the first image sensor array;
   a line optical black (LOB) image sensor array including a plurality of LOB image sensor circuits configured to compensate for a dark level for each line, the LOB image sensor array arranged at on at least one of a first side and a second side of the first image sensor array; and
   a light leakage compensating image sensor array including a plurality of light leakage compensating image sensor circuits, the light leakage compensating image sensor array between the first image sensor array and the LOB image sensor array, wherein
   the image sensor array is configured to perform global shutter,
   a length of the FOB image sensor array is the same as a length of the first image sensor array, and a length of the LOB image sensor array is the same as a sum of a width of the first image sensor array and the width of the FOB image sensor array, and
   each of the first image sensor circuits and the FOB image sensor circuits includes,
      a blooming transistor having one terminal connected to a first power voltage source, another terminal and a gate, the gate of the blooming transistor configured to receive a blooming control signal,
      a first transfer transistor having one terminal connected to the another terminal of the blooming transistor, another terminal, and a gate, the gate of the first transfer transistor configured to receive a first transfer signal, a second transfer transistor having one terminal connected to the other terminal of the first transfer transistor, a gate configured to receive a second transfer signal, and another terminal connected to a floating diffusion area, a reset transistor having one terminal connected to a first power voltage source, a gate configured to receive a reset control signal, and another terminal connected to the floating diffusion area, a conversion transistor having one terminal connected to a second power voltage source and a gate connected to the floating diffusion area, the conversion transistor configured to convert electric charges stored in the floating diffusion area into an electric signal, a photodiode having one terminal connected to a third power voltage source and another terminal connected to a common terminal of the blooming transistor and the first transfer transistor, and a storage diode having one terminal connected to the third power voltage source and another terminal connected to a common terminal of the first transfer transistor and the second transfer transistor, wherein a first area of the photodiode is configured to receive light, and another area of the photodiode and the storage diode are separated from each other by a well.

2. The image sensor array of claim 1, wherein each of the first image sensor circuits and the FOB image sensor circuits further comprises a selection transistor including a gate configured to receive a selection control signal, the selection transistor configured to block or pass the electric signal output from another terminal of the conversion transistor according to the selection control signal, and the first power voltage source and the second power voltage source have a relatively higher voltage level than a voltage level of the third power voltage source.

3. An image sensor array having a plurality of lines, the image sensor array comprising:

a first image sensor array having a plurality of first image sensor circuits arranged in two dimensions;

a frame optical black (FOB) image sensor array including a plurality of FOB image sensor circuits configured to compensate for a dark level of a frame, the FOB image sensor array on at least one of a first portion and a second portion of the first image sensor array;

a line optical black (LOB) image sensor array including a plurality of LOB image sensor circuits configured to compensate for a dark level for each line, the LOB image sensor array arranged at on at least one of a first side and a second side of the first image sensor array; and a light leakage compensating image sensor array including a plurality of light leakage compensating image sensor circuits, the light leakage compensating image sensor array between the first image sensor array and the LOB image sensor array, wherein the image sensor array is configured to perform global shutter, a length of the FOB image sensor array is the same as a length of the first image sensor array, and a length of the LOB image sensor array is the same as a sum of a width of the first image sensor array and the width of the FOB image sensor array, and the light leakage compensating image sensor circuits include, a blooming transistor having one terminal and a gate that are commonly connected to a first power voltage source, a first transfer transistor having one terminal connected to another terminal of the blooming transistor and a gate connected to a third power voltage source, a second transfer transistor having one terminal connected to another terminal of the first transfer transistor, a gate configured to receive a second transfer signal, and another terminal connected to a floating diffusion area, a reset transistor having one terminal connected to a first power voltage source, a gate configured to receive a reset control signal, and another terminal connected to the floating diffusion area, a conversion transistor having one terminal connected to a second power voltage source and a gate connected to the floating diffusion area, the conversion transistor configured to convert electric charges stored in the floating diffusion area into an electric signal, a photodiode having one terminal connected to a third power voltage source and another terminal connected to a common terminal of the blooming transistor and the first transfer transistor, and a storage diode having one terminal connected to the third power voltage source and another terminal connected to a common terminal of the first transfer transistor and the second transfer transistor, wherein a first area of the photodiode is configured to receive light, and another area of the photodiode and the storage diode are separated from each other by a well.

4. The image sensor array of claim 3, wherein the light leakage compensating image sensor circuit further comprises a selection transistor including a gate configured to receive a selection control signal, the selection transistor configured to block or pass the electric signal output from another terminal of the conversion transistor according to the selection control signal, and the first power voltage source and the second power voltage source have a relatively higher voltage level than a voltage level of the third power voltage source.

5. An image sensor array having a plurality of lines, the image sensor array comprising:

a first image sensor array having a plurality of first image sensor circuits arranged in two dimensions;

a frame optical black (FOB) image sensor array including a plurality of FOB image sensor circuits configured to compensate for a dark level of a frame, the FOB image sensor array on at least one of a first portion and a second portion of the first image sensor array;

a line optical black (LOB) image sensor array including a plurality of LOB image sensor circuits configured to compensate for a dark level for each line, the LOB image sensor array arranged at on at least one of a first side and a second side of the first image sensor array; and a light leakage compensating image sensor array including a plurality of light leakage compensating image sensor circuits, the light leakage compensating image sensor array between the first image sensor array and the LOB image sensor array, wherein the image sensor array is configured to perform global shutter, a length of the FOB image sensor array is the same as a length of the first image sensor array, and a length of the LOB image sensor array is the same as a sum of a width of the first image sensor array and the width of the FOB image sensor array, and the LOB image sensor circuits includes, a blooming transistor having one terminal connected to a first power voltage source and a gate, the gate of the blooming transistor configured to receive a blooming control signal, a first transfer transistor having one terminal connected to another terminal of the blooming transistor and a gate, the gate of the first transfer transistor configured to receive a first transfer signal, a second transfer transistor having one terminal connected to another terminal of the first transfer transistor, a gate configured to receive a second transfer signal, and another terminal connected to a floating diffusion area, a reset transistor having one terminal connected to a first power voltage source, a gate configured to receive a reset control signal, and another terminal connected to the floating diffusion area, and a conversion transistor having one terminal connected to a second power voltage source and a gate connected to the floating diffusion area, the conversion transistor configured to convert electric charges stored in the floating diffusion area into an electric signal.

6. The image sensor array of claim 5, wherein the LOB image sensor circuit further comprises a selection transistor including a gate configured to receive a selection control signal, the selection transistor configured to block or pass the electric signal output from another terminal of the conversion transistor according to the selection control signal.

* * * * *